March 4, 1969  P. F. RICHARDSON  3,430,984
WEIGHT TRANSFER SYSTEM

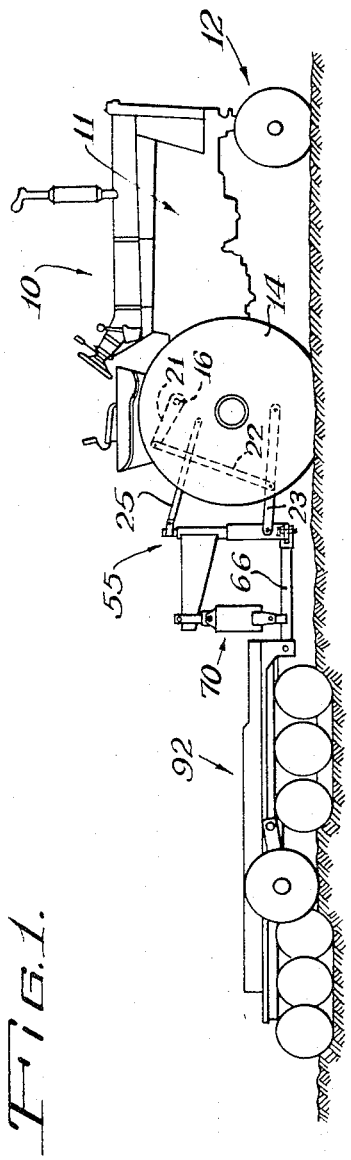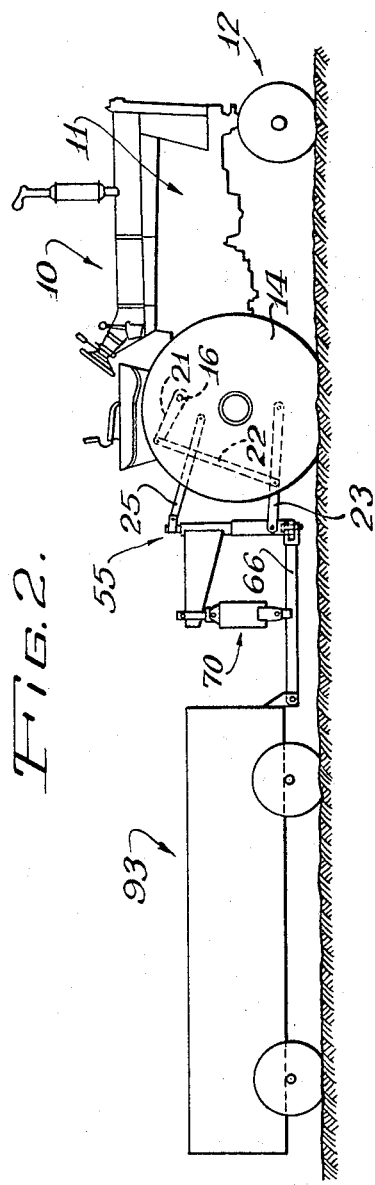
Inventor:
Pierce F. Richardson

Filed March 30, 1967  Sheet 2 of 4

Inventor:
Pierce F. Richardson
By Walter G. Gunson
Atty.

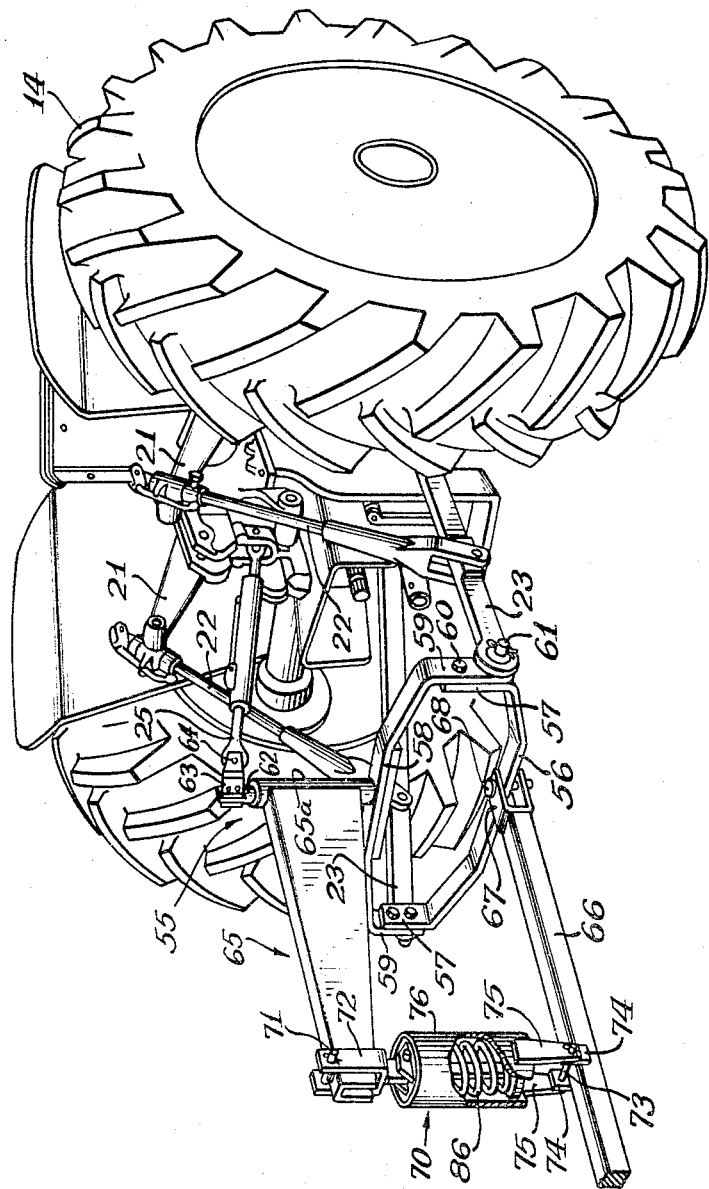

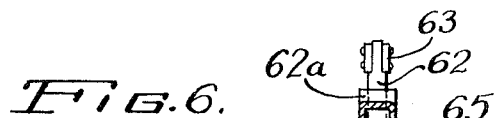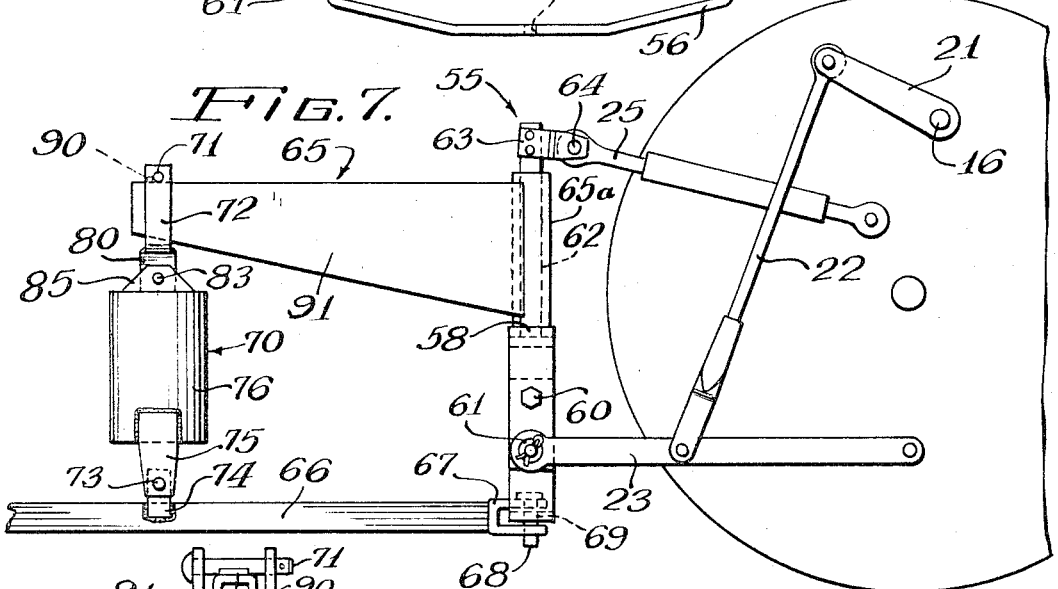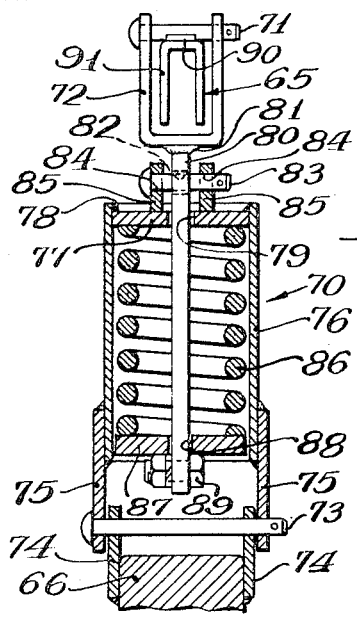

3,430,984
WEIGHT TRANSFER SYSTEM
Pierce F. Richardson, Oakbrook, Ill., assignor to International Harvester Company, Chicago, Ill., a corporation of Delaware
Filed Mar. 30, 1967, Ser. No. 627,077
U.S. Cl. 280—405                                       1 Claim
Int. Cl. B60d; B62d 53/00; A01b 63/112

ABSTRACT OF THE DISCLOSURE

A hitch linkage mechanism for attaching trailed equipment to a tractor vehicle having a hydraulic power lift device for alternatively raising and lowering the linkage responsive selectively to variations in draft load from the equipment or from a plurality of manually controlled mechanisms, and wherein a frame connected between links of the hitch mechanism facilitates the attachment of the trailed equipment to the tractor and permits transference of a pre-selected amount of weight from the equipment being trailed to the tractor.

Background of the invention

This invention relates to implement-attaching hitch mechanisms for agricultural tractors having a draft and position control system of the type wherein the draft load is balanced against a force-resisting and yieldable means, generally in the form of a spring, and power lift mechanism is actuable responsive to variations in the draft load for adjusting the working depth of an attached implement in consonance with such variations, and which is independently responsive to a manually controlled device for varying the vertical elevation or position of an attached or trailed implement. A hitch of this type is generally operative in the draft control range thereof to maintain constant the compressive or tensile load on said hitch mechanism, and operates to change the position into which it has been set when the compressive or tensile load thereon is changed, and is usually associated with a draft and position control system which may be of the type described, for instance, in the United States Patent No. 3,132,699 issued to Andrew Brudnak, Jr. and Herbert G. Akins.

As is well known mechanisms of this type have heretofore been proposed and utilized for effecting draft control with mounted or semi-mounted implements but were not equally adaptable for implements or vehicles of the trail behind type. The term "trailed equipment" as used herein designates a vehicle or implement attached to a tractor and trailed along the ground behind the tractor on wheels or other ground engaging means and having at least part of its own weight carried by the ground engaging means. One of the earliest known arrangements utilizing a draft control and hitch linkage arrangement for accomplishing a weight transfer type of operation with trailed equipment was disclosed in the Wulff et al. United States Patent No. 3,062,561 issued Nov. 6, 1962. The arrangement shown therein, however, is not adaptable for a great variety of types of trailed implements and, furthermore, requires an additional drawbar connection for attaching the trailed equipment directly to the vehicle rather than through the links of the hitch linkage mechanism. Subsequent to this disclosure other arrangements have been proposed for the same purpose but most such devices are believed to be somewhat complicated, cumbersome and costly to fabricate and hence would not seem to be altogether satisfactory.

Summary of the invention

The present invention is more specifically directed to the utilization of a hitch mechanism of the type heretofore noted for effecting the transfer of weight from a trailed vehicle or implement to a tractor to avoid slipping of the tractor drive wheels on the ground. In the invention as proposed the hitch mechanism is subjected to a load dependent on the amount of the weight it is desired transferred being maintained irrespective of whether the tractor changes its position of inclination or position of height relative to the trailed vehicle. The invention proposed herein offers the advantage of being able to maintain weight transferred independent of any changed position in the inclination of a tractor relative to the trailed equipment. Furthermore, this transference of a predetermined amount of weight is automatically accomplished once the mechanism is pre-set for the desired weight transfer. Additionally, such weight transfer operation may be performed by means of a generally conventional draft and position control system wherein the associated hitch linkage mechanism is readily modified by the addition of a simple adapter or frame assembly. Another advantage it offers is that the trailed equipment may be connected directly to the links of the hitch linkage mechanism without having to be otherwise directly connected to the tractor through an added drawbar connection. A further advantage is found in the feature that it is more universal in application since it may be utilized with a greater variety of types of trailed equipment, and is, of course, readily adaptable to conventional hitch linkage mechanisms. Furthermore, the arrangement as proposed provides a form of safety feature in that backward tilt of a tractor is limited when the tractor is so equipped.

The principle object, therefore, of the present invention is to provide an improved mechanism for attaching trailed equipment to the hitch mechanism of a tractor whereby a predetermined amount of weight is transferred from the trailed equipment to the tractor irrespective of the position of inclination of the trailed equipment relative to the tractor.

Another object is to provide a frame assembly mounted on the outboard ends of the links of an implement-attaching hitch mechanism of a tractor for permitting the use of such mechanism for attaching trailed equipment to the tractor and for permitting the transference of a predetermined amount of weight from the trailed equipment to the tractor.

A further object is to provide an adapter or frame assembly readily mountable on the links of an implement attaching hitch linkage mechanism so as to accommodate an associated draft control system in providing pre-selectable transfer of weight from a trailed implement to the tractor trailing such implement.

A still further object is to provide a means of improving traction by transferring weight to the drive wheels of a tractor from trailing or semi-trailing equipment wherein the tractor is equipped with a draft and position controlled three-point hitch with either upper or lower link sensing.

A more specific object is to provide an adapter, shaped to resemble an inverted Y, which is attached to the three links of a hitch linkage and includes a swing boom pivotally mounted thereto while the outboard end of said boom provides an attaching point for a chain or link attached to the trailed equipment by way of tongue of said equipment.

A still further specific object is to provide an inverted Y shaped adapter frame assembly, adapted for attachment to the upper and lower links of an implement attaching hitch linkage mechanism on a tractor vehicle, and including a swingable boom pivotally mounted thereon and having a resiliently yieldable link connected between an outboard end of said boom and the tongue of a vehicle being trailed by the tractor.

Description of the drawings

FIGURE 1 is a side elevational view of a tractor and an attached tillage trail behind implement and embodying the proposed invention;

FIGURE 2 is a view similar to FIGURE 1 but showing the application with a transport trail behind vehicle;

FIGURE 5 is a perspective view of a fragment of the rear portion of a tractor with the adapter or frame assembly of the proposed invention therein;

FIGURE 6 is a rear end view, on an enlarged scale, of the proposed adapted assembly looking toward the front end of the associated tractor;

FIGURE 7 is a side elevational view, on an enlarged scale of the proposed adapted assembly; and FIGURE 8 is a vertical sectional view of the proposed resilient link for connecting the adapted to the tongue of a trailed vehicle.

Description of the preferred embodiment

Figure 3:
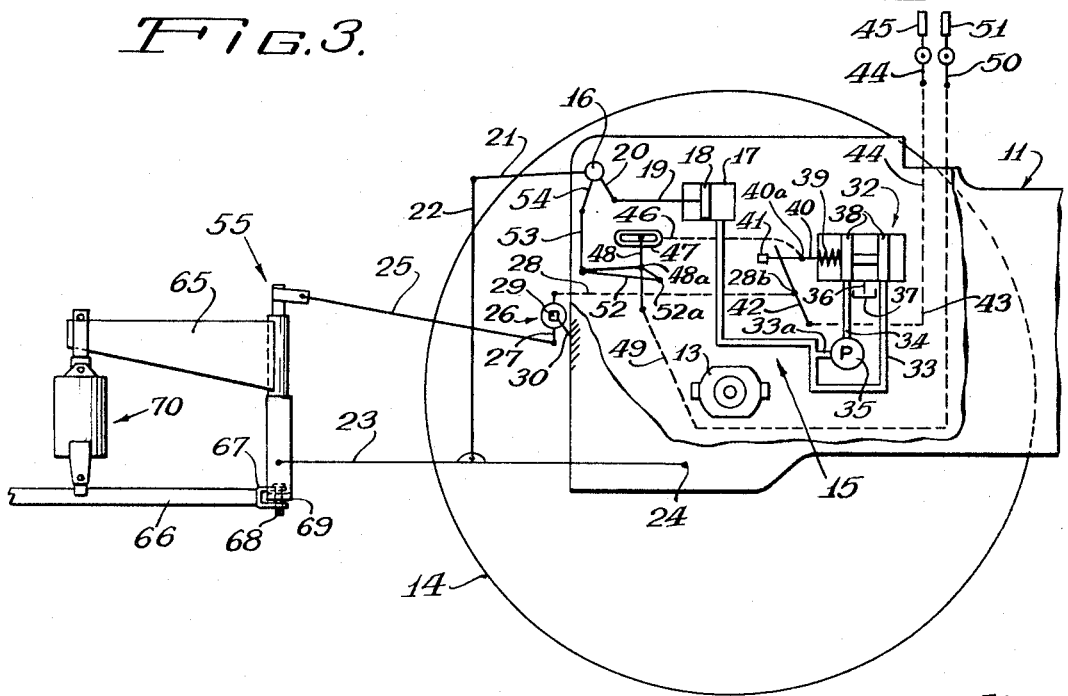
FIGURE 3 is a fragmentary side elevational view of the rear portion of the tractor of the preceding views, schematically showing the power lift system and wherein the draft and position control system is shown in association with an upper link sensing hitch mechanism.

Referring now to the drawings, it will be seen that the arrangement selected for depicting a preferred form or application of the invention includes a tractor vehicle 10 having a frame indicated in its entirety by the reference numeral 11 and having at its front end a steerable wheel assembly 12 and at the rear portion thereof a housing assembly 13 which supports in conventional fashion a pair of laterally spaced traction wheels 14.

Figure 4:
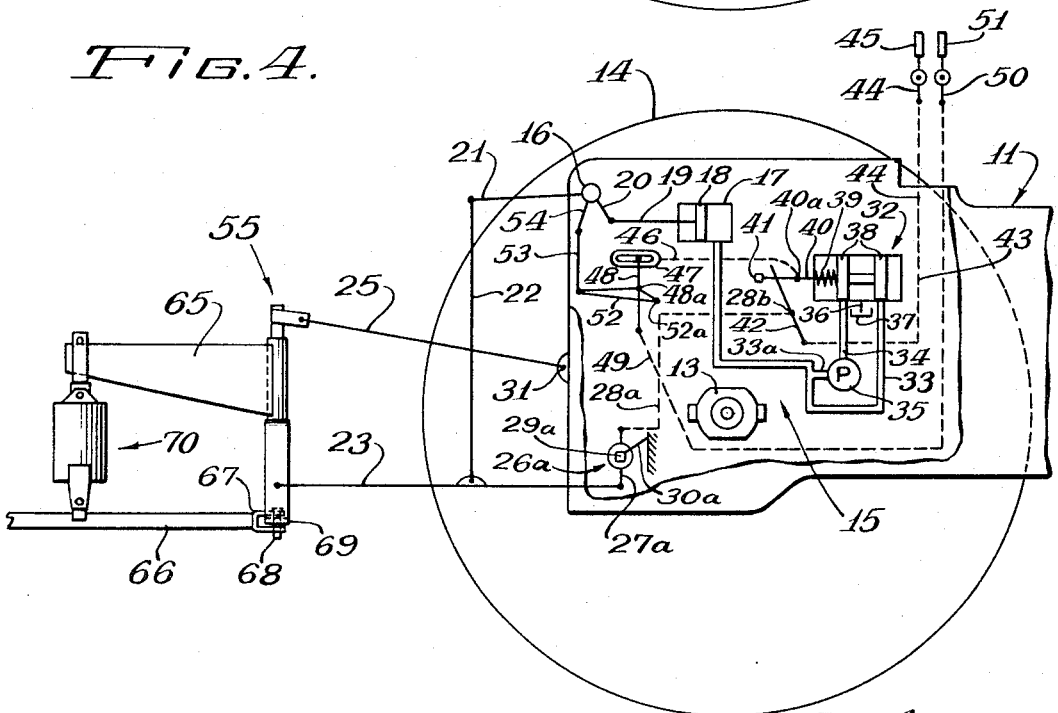
FIGURE 4 is a view similar to FIGURE 3 but showing the controls systems in association with the lower link sensing of a hitch mechanism.

The tractor has associated therewith a power lift unit means, shown diagrammatically as portions of FIGURES 3 and 4 and indicated generally by the reference numeral 15, which may be suitably mounted and carried by the tractor frame 11 as is well understood. This unit may include in association therewith a suitably journalled rockshaft 16, a cylinder 17 having a piston 18 therein joined by a connecting rod 19 to a crank arm 20 constrained for rotation with said rockshaft, and a pair of laterally spaced lift arms 21, 21 mounted on opposite ends of said rockshaft and suitably secured thereto for rotation therewith. Said lift arms are connected by lift or drop links 22, 22 to respective lower draft links 23, 23 which latter links, in turn, are pivotally connected at their forward ends to the rear portion of the tractor, as indicated at 24, to permit conventional vertical and slingable movement thereof. An upper or top draft link 25 is connected at its forward end to the tractor and together with the lower links 23, 23 comprise what is commonly termed implement-attaching linkage mechanism or draft means for effecting a draft or load connection between the tractor and an implement being borne or trailed by the vehicle.

The hitch mounting means constituting the support for the forward end of the upper link 25 on the tractor incorporates therein, in one arrangement of the linkage mechanism, the force-resisting and yieldable means represented by the torsion bar assembly indicated generally at 26. Since a device of this type is specifically disclosed in U.S. Patent No. 3,241,620 issued to Andrew Brudnak, Jr., reference may be had thereto for further details of the construction and operation thereof. Suffice it to say that the link 25 is pivotally attached to a lever assembly 27, an oppositely extending portion of which is pivotally connected to a motion-transmitting draft responsive to control linkage connection 28, and while said lever assembly 27 is pivotally mounted on the tractor it is also connected to one end of a torsion bar member 29 of assembly 26 the opposite end of which bar is anchored against rotation to the tractor frame 11 by suitable anchoring means such as indicated diagrammatically at 30. In the linkage arrangement shown in FIGURE 4 the upper link 25 is pivotally connected to the tractor, as indicated at 31, while the lower links 23, 23 are connected to a lever assembly 27a, of torsion bar assembly 26a, with the oppositely extending portion of said lever assembly connected to the draft responsive control linkage 28a, and the torsion bar 29a, is suitably anchored to the frame as indicated at 30a. The construction of the torsion bar arrangement for the lower links is detailed in U.S. Patent No. 3,239,013 issued to Kurt E. Hansmann and reference may be had thereto for further details of the construction and operation thereof.

The induced motion constituting the signal produced as a result of movement of the control linkage 28 by the draft link 25, in one instance, and the draft links 23, 23 in the other instance, is useably translated to control the power lift unit 15 by coordinated actuation of an actuator or control valve means such as 32. The latter actuator or valve may be connected by a conduit 33 with the ram cylinder 17 and by conduit 34 with the suction inlet of a hydraulic pump 35, while a conduit 33a connects the discharge outlet of the pump with the ram cylinder by way of conduit 33. A further conduit 36 connects said actuator valve with a fluid reservoir such as indicated at 37. A piston element 39 in said actuator valve has a biasing or centering spring 39 associated therewith for a purpose which will be understood as the description proceeds. A valve actuating member in the form of a connecting rod 40 connected to said piston element has a transverse pin or abutment stop member on the outer end thereof as shown at 41. The inner end of control linkage connection 28 is pivotally connected at 28b to a link or lever 42 intermediate the ends thereof and one end of said lever is positioned for abutment with the transverse pin member 41 while the opposite end is pivotally connected to a push rod or force transmitting link indicated at 43, that, in turn, is connected by a control lever, such as 44, to a pivotally mounted manual control handle 45.

Pivotally connected at 40a to the valve actuating member or connecting rod 40, intermediate the piston 38 and the point of engagement of lever 42 with the abutment stop or pin 41, is a link member 46 the opposite end of which is slotted at 47 to slidably accommodate one end of a walking beam member 48. The opposite end of said walking beam is pivotally connected to a push rod or connecting link indicated at 49, that, in turn, is connected by a control lever, such as 50, to pivotally mounted manual control handle 51. The walking beam 48 intermediate the ends thereof is pivotally connected to a differential crank member 52 at a point such as 48a intermediate the ends of the crank and offset from a line extending between the ends of said crank. One end of the latter crank is pivotally mounted at 52a on the frame 11 while the opposite end is pivotally connected to a link 53 and the opposite end of the latter link is pivotally connected to a crank arm 54 secured to and constrained for rotation with rockshaft 16. The linkage mechanism associated with and actuated by the control handle 51 is commonly termed the position control linkage system while that associated with the control handle 45 is generally termed the draft or load control linkage system.

Since the foregoing power lift unit together with the associated position and draft control systems are described in somewhat greater detail in the above noted Brudnak et al. Patent No. 3,132,699 a more comprehensive description of the details thereof is omitted and only a generally simplified or skeletonized embodiment or form of these systems is illustrated and described herein. It will be seen by reference to the drawings hereof that the power lift and control systems shown in FIGURE 4 are substantially identical to those illustrated in FIGURE 3 and hence the same reference numerals are applied to like elements in both figures, the suffix "a" being used to differentiate therebetween.

Now in accordance with the more specific teachings of the present invention an adapter or frame-like assembly 55 is provided for affixment to the outwardly projecting ends of the upper and lower links of the hitch linkage mechanism so as to accommodate the attachment of trailed equipment, such as a vehicle or implement, to the tractor. As illustrated in one preferred embodiment thereof the adapter may comprise a lower cross bar member 56 having upwardly turned end portions 57, 57 which receive in overlying relationship an upper cross bar member 58 having downwardly turned end portions 59, 59 which are fixedly secured to the upturned ends by suitable affixing means such for instance as the bolt and nut means indicated at 60. It will be appreciated, of course, teachings hereof. Suitable pivotable connections, such as welding, riveting, brazing or the like may be used for securing the respective end portions together, or, if desired, the upper and lower cross bars may be fashioned as an integral frame unit, without deviating from any teachings hereof. Suitable pivotable connecitons, such as the pins 61, may be provided for attaching the frame to the lower links 23, 23 and if desired, said pins may be fashioned as extensions of the bolt fastening means 60, or as the pivot pins conventionally provided on the outer ends of lower draft links for attaching equipment to the linkage mechanism. An upper pintle pin or pedestal-like bearing mast 62 fixedly mounted on the upper cross bar member 58 intermediate the opposite ends thereof has its upper end fixedly mounted in a coupling or fastener 63 which, in turn, is pivotally attached by suitable removable pin means 64 to the outward or rearwardly projecting end of the upper link 25. Pivotally mounted on the pin or bearing mast 62 is a boom-like member 65 which extends rearwardly therefrom and is swingable in a transverse plane generally parallel to the ground.

Generally, trail behind vehicles or implements are provided with a conventional form of rigid tongue member, such as represented at 66, that is pivotally attached at one end of the tongue to the assicoated vehicle or implement in a manner such as to be swingable in a horizontal as well as a vertical plane. The opposite or forwardly extending end of said tongue may be provided with a bifurcated clevis-like clamp or coupler 67 having aligned apertures in opposite arms thereof adapted to receive a removable fastener such as the pin 68. The latter pin may be insertably positioned in aligned apertures in coupler 67 and in a registering aperture 69 in cross bar 56, intermediate opposite ends thereof, for the purpose of attaching the trailed equipment in a freely swingable relation to the pulling or driving tractor vehicle. Usually the removable pin 68 is of such dimension with respect to its associated registering apertures that a loose fit results and a very limited vertical movement of the tongue relative to the tractor is tolerated.

A connecting link or hanger member 70 is pivotally connected at one end of said member to the boom member 65 by way of a removable pin 71 positioned over the top thereof and insertably receivable in aligned apertures in opposite arms of a U-shaped strap or bracket 72 affixed to one end of said link, while the opposite or lower end of said link is pivotally connected to the tongue 66 by a removable pin 73 insertably received in apertures in a pair of spaced straps or a bracket 74 affixed to said tongue and in a pair of straps or legs 75 affixed to said link. It will be appreciated however, that other suitable hanger straps or clamping means may be provided in lieu of the illustrated arrangement for pivotally attaching the link to the tongue.

One preferred form of link 70 comprises a hollow body or casing 76 having a transverse member 77 fixedly secured, by suitable means such, for instance, as the welds 78, in one end of said casing and having an opening 79 therein adapted to slidably accommodate a push-pull member 80 extending therethrough. The outwardly projecting end of member 80 is fixedly attached to the bracket 72 by suitable means such as the welds indicated at 81. An aperture 82 in member 80 is provided for receiving a removable lock-out bolt or pin 83 which is insertably received in said aperture and in aligned apertures 84, 84 in spaced ears 85, 85 suitably affixed to transverse member 77 on opposite sides of the opening 79 therein. Positioned within casing 76 is a spring 86 one end of which is disposed in abutting relation with the transverse member 77 while the opposite end of the spring abuts an additional transverse member 87 having an aperture 88 for slidable accommodation of the push-pull member 80 therein. A suitable abutment or stop such, for instance, as the bolt and nut means 89 is provided proximate the end of member 80 to support transverse member 87 in a seating relation with one end of spring 86. In order to fixedly position the link 70 longitudinally on the boom and prevent said link from normally slipping off said boom a transversely extending bar-like projection or rail member 90 is suitably fashioned on the upper surface of said boom and the pin 71 disposed for contacting engagement therewith. In an emergency, however, such as in event of the tongue breaking away from the adapter, the link 70 would readily slip or ride up over the projection stop 90 and thereby effect complete separation of the trailed equipment and thus prevent possible damage to the equipment or the tractor.

The boom 65, which may be fabricated in any suitable manner, as illustrated herein comprises a central hollow body portion that may be fashioned from an inverted U-shape in cross-section beam member 91, and a hub-like bearing member 65a suitably affixed to one end of said body portion and having a central longitudinally extending bore therein adapted to rotatably receive the pintle pin or mast 62.

In the event the safety feature, provided incident to the use of a rigid connecting link between the boom member and tongue whereby an excessive amount of accidental rearward tilt of the tractor is prevented, is not, because of the type or size of equipment being trailed or for other reasons, of paramount importance a flexible connection such as a chain or cable may be utilized in lieu of said connecting link between the boom and tongue without deviating from any of the inventive concepts hereof.

It will be seen, of course, that by removing the lock-out pin 83 the link 70 becomes a yieldable and resilient member instead of a rigid link connection for purposes which subsequently will be discussed.

Now in order to understand the operation of the present invention reference is had to the drawings hereof where it will be seen that movement of the draft control handle 45 in a direction that rotates lever 42 counterclockwise (FIGS. 3 and 4) about its pivot with linkage 28 causes said lever to ultimately engage pin 41 and through valve actuating member 40 moves piston 38, of valve 32, leftwardly against the reaction of spring 39 therein whereupon the pump 35 is placed in communication by way of conduit 36 with the fluid reservoir 37 and fluid is then delivered under pressure through conduits 33a and 33 to the lift cylinder 17. Upon receipt of fluid in cylinder 17, piston 18 is moved leftwardly and acting through its connecting rod 19, crank arm 20, rockshaft 16 and lift links 21, 21 and 22, 22 raises the hitch linkage mechanism. Upon completion of the lifting movement handle 45 may be manually returned to neutral with valve 32 likewise returning to neutral and fluid remaining locked in the circuit, or if a draft responsive signal is received in linkage 28 lever 42 may be forced to pivot about its pivotal connection with link 43 and thus permit valve 32 to be returned to a neutral position by reaction of spring 39.

Upon movement of position control handle 51 in a direction that rotates walking-beam 48 counterclockwise about its pivot connection with the differential crank member 52, the link member 46 is moved leftwardly against the reaction of spring 39 whereupon pump 35 is placed in communication by way of conduit 36 with fluid reservoir 37 and fluid is then delivered under pressure through conduits 33a and 33 to lift cylinder 17 to effect a raising of the associated linkage mechanism. When the linkage has been raised to a desired elevation the valve 32 is returned to neutral either by way of handle 51 or the follow-up linkage indicated by the interconnected members comprising crank arm 54, link 53, and differential crank 52 as is more fully explained in the above noted Brudnak et al. U.S. Patent 3,132,699.

Assume initially that the tractor involved is one wherein the torsion bar assembly is actuated by the upper draft link, as illustrated in FIGURE 3, and the trail behind agricultural implement attached is a disk harrow such as depicted in FIGURE 1 and designated generally by the reference numeral 92. In this instance the tongue 66 thereof is attached by pin 69 to the cross-bar 56, of adapter 55, and the link 70 is interconnected as a rigid link between boom member 65 and said tongue. Now the handle 45 is set to a predetermined position correlated with the point at which a draft responsive signal in linkage 28, resulting from a change in inclination or position of height of the tractor relative to the trailed implement, becomes effective to actuate the valve 32 and lift or lower the hitch linkage mechanism correspondingly. Assume, for instance, the tractor wheels encounter soft or loose earth and tend to sink into the ground whereupon the trailed implement will pivot upwardly about the lower pivotal connection of adapter 55 with the lower links 23, 23 and by so doing induce a compressive force in the upper draft link 25 and through the torsion bar assembly 26 effects a leftward movement of linkage 28. Since the position of lever 42 has been pre-selected, by operation of handle 45, to engage pin 41 upon movement of linkage 28 responsive to a predetermined change in draft or load when this has been attained the valve 32 will be actuated to lift the linkage mechanism and thereby transfer a portion of the trailed implement weight to the tractor to increase the ground engaging friction of the tractor wheels and thus prevent the slipping thereof. As conditions are such as to permit the relative inclination or position of the tractor relative to the implement to be normalized the valve 32 will then be actuated by the spring 39 therein to lower the hitch linkage and return the system to its previous normal condition. In the event the tractor is elevated relative to the trailed implement a tensive force is created in the upper draft link 25 and the valve 32 is actuated to effect a corresponding temporary lowering of the hitch linkage and the system will be returned to normal when the relative relationship between the tractor and implement returns to normal.

Assume now a trailed implement with a tractor wherein the torsion bar assembly is incorporated in the lower draft links 23, 23. In this instance the upper draft link 25 is pivotally connected to the tractor and the reactive force resulting from a change in relationship between the tractor and the implement is reflected in the lower draft links and through the torsion bar assembly 26a and control linkage 28a to the actuator valve 32 to accomplish the action heretofore explained for an upper link sensing mechanism. In the lower link sensing mechanism it will be appreciated the forces acting on the torsion bar assembly will be in a direction reverse from that of the upper link device hence the reversal of direction in movement of the sensing signal is accommodated in the linkage 28a as illustrated in the Kurt E. Hansmann U.S. Patent No. 3,239,013.

Assume next that the tractor involved has an upper link sensing unit and the trail behind vehicle is a wagon, or the like, such as indicated in FIGURE 2, and represented generally by reference numeral 93. In this instance after the tongue 66 is suitably attached to the cross bar 56, of adapter 65, and link 70 is interconnected between boom 65 and said tongue the lock-out pin 83 is removed thus transforming said link from a rigid to a yieldable resilient connection between said boom and tongue. In this instance the position control system of the tractor is utilized in lieu of the draft control system thereof. Accordingly, handle 51 is moved in a direction such as to cause walking beam 48 to rotate counterclockwise and through the link member 46 actuate valve 32 to produce a lifting of the hitch linkage mechanism and attached tongue 66 a distance sufficient to effect the degree of weight transfer desired, after which the position follow-up mechanism including interconnected members 52, 53 and 54 will operate to return valve 32 to neutral and thus lock the hydraulic fluid in the lift cylinder circuit in the position then attained. Now in the event of a change in relative relationship between the tractor and vehicle, as heretofore discussed, the spring 86 in link 70 becomes yieldable to temporarily relieve or increase as necessary the degree of weight being transferred, and as soon as this temporary change in relative relationship is passed the system returns to normal with the same weight transfer setting heretofore selected being retained. Thus it will be seen that this arrangement readily accommodates passage over uneven ground and changes in the relative relationship and movement between tractor and trailed vehicle resulting therefrom without having to make other compensating corrections or adjustments to the mechanism to accommodate such changes.

It will be evident, also, from the above that when the tractor is equipped to provide lower link sensing and a vehicle is trailed therebehind, the operation will be identical to that previously described for the upper link sensing arrangement, since the control for the weight transfer is by way of the position control system rather than the draft or load control system.

What is claimed is:

1. In a tractor having a vertically adjustable hitch linkage for attaching trailed equipment to the tractor including a single upper draft link and a pair of laterally spaced lower draft links, power operated means for lifting, lowering and maintaining a preselected position of the linkage, draft control means for said power operated means including a spring assembly loadable in opposite directions from a neutral position and connected with at least one of the links of said linkage and operable to measure the draft load imposed thereon by attached trailed equipment and to initiate lifting or lowering of the linkage to maintain a predetermined draft load and including manually operable means for adjusting said draft control means to determine the draft load to be maintained on the hitch linkage, and position control means for operating said power operated means to lift and lower the hitch linkage and to maintain a predetermined position thereof and including manually operable means for adjusting the predetermined elevational position of the hitch, the combination therewith, comprising: adapter means mounted on said hitch linkage and operative for attaching trailed equipment and transferring a part of the weight of attached trailed equipment to the tractor to increase the traction thereof, said adapter means comprising a frame pivotally mounted for movement in a vertical plane about an axis extending between trailing ends of the lower draft links of said hitch and including a load-attaching portion that extends below the pivotal axis of the frame, said adapter means further having a member extending outwardly therefrom and pivotally mounted for movement in a horizontal plane relative to said frame, a tongue member connected between said load-attaching portion of the frame and attached trailed equipment and constructed and arranged to permit attached trailed equipment to swing relative to the tractor in vertical and horizontal planes, and force-transmitting means connecting the tongue to said outwardly extending member comprising resilient means adapted to be selectively locked or unlocked so as to be respectively rigid or resilient and thus operative respective to control in one instance by the draft control means and in another instance by the position control means for transmitting a lifting force from the hitch linkage to attached trailed equipment.

References Cited

UNITED STATES PATENTS

| | | | |
|---|---|---|---|
| 2,970,653 | 2/1961 | Hershman | 172—465 |
| 3,132,699 | 5/1964 | Brudnak et al. | 172—9 |
| 3,194,319 | 7/1965 | Faure | 172—9 |
| 3,198,261 | 8/1965 | Clarke | 172—9 |
| 3,239,013 | 3/1966 | Hansmann | 172—10 |
| 3,275,084 | 9/1966 | Bunting | 172—9 |
| 3,275,085 | 9/1966 | Bunting et al. | 172—10 |
| 3,314,484 | 4/1967 | Bunting et al. | 172—9 |

LEO FRIAGLIA, *Primary Examiner.*

U.S. Cl. X.R.

172—9; 280—449